United States Patent
Nguyen et al.

(10) Patent No.: US 11,189,039 B2
(45) Date of Patent: Nov. 30, 2021

(54) ENHANCED STAR TRACKING

(71) Applicant: RAYTHEON COMPANY, Waltham, MA (US)

(72) Inventors: Huy P. Nguyen, Tucson, AZ (US); Dieter G. Krausser, Oro Valley, AZ (US); Pradyumna Kannan, Sterling, VA (US)

(73) Assignee: Raytheon Company, Waltham, MA (US)

( * ) Notice: Subject to any disclaimer, the term of this patent is extended or adjusted under 35 U.S.C. 154(b) by 47 days.

(21) Appl. No.: 16/746,332

(22) Filed: Jan. 17, 2020

(65) Prior Publication Data

US 2021/0225011 A1 Jul. 22, 2021

(51) Int. Cl.
*G06T 7/246* (2017.01)
*G06T 7/73* (2017.01)
(Continued)

(52) U.S. Cl.
CPC ............ *G06T 7/248* (2017.01); *G06K 9/0063* (2013.01); *G06K 9/4609* (2013.01);
(Continued)

(58) Field of Classification Search
CPC .... B64G 1/361; G01C 21/025; G06K 9/6211; G06K 9/00; G06K 9/00087;
(Continued)

(56) References Cited

U.S. PATENT DOCUMENTS

| 5,745,869 A | 4/1998 | van Bezooijen |
| 8,041,118 B2 | 10/2011 | Fowell |

(Continued)

FOREIGN PATENT DOCUMENTS

CN 104316049 B * 6/2017

OTHER PUBLICATIONS

Cole, et al., "Fast Star Pattern Recognition Using Spherical Triangles", American Institute of Aeronautics and Astronautics/AAS Astrodynamics Specialist Conference and Exhibit, Aug. 16, 2004 (12 pgs.).

(Continued)

*Primary Examiner* — Ian L Lemieux
(74) *Attorney, Agent, or Firm* — Lewis Roca Rothgerber Christie LLP (57) ABSTRACT

A system and method for star tracking includes: capturing an image of stars; detecting and selecting visible stars from the captured image; extracting features from the selected stars by forming a convex hull from the selected stars to generate a spherical polygon; computing the area and higher order moments of the spherical polygon; and pattern matching the extracted feature against a database of star catalog. The pattern matching includes matching the area of the spherical polygon to a plurality of polygon areas stored in the database and when the number of the matching candidates is more than one, matching a next extracted higher order moment with a respective higher order moment in the database, and repeating said matching of the next extracted higher order moment until the number of the matching candidates is equal to one.

20 Claims, 6 Drawing Sheets

(51) Int. Cl.
*G06K 9/00* (2006.01)
*G06K 9/46* (2006.01)
*G06K 9/62* (2006.01)

(52) U.S. Cl.
CPC .............. *G06K 9/6202* (2013.01); *G06T 7/74* (2017.01); *G06T 2207/10032* (2013.01)

(58) Field of Classification Search
CPC ............. G06K 9/00617; G06K 9/0063; G06K 9/4609; G06K 9/6202; G06T 2207/10016; G06T 2207/10032; G06T 7/248; G06T 7/50; G06T 7/60; G06T 7/73; G06T 7/74
See application file for complete search history.

(56) References Cited

U.S. PATENT DOCUMENTS

| | | | |
|---|---|---|---|
| 9,702,702 B1* | 7/2017 | Lane | ........................ G06T 7/215 |
| 10,482,348 B1* | 11/2019 | Sieracki | .................... G06T 7/20 |
| 2005/0133671 A1 | 6/2005 | Wang et al. | |
| 2006/0085130 A1* | 4/2006 | Belenkii | .............. G01C 21/025 |
| | | | 701/468 |
| 2011/0254969 A1* | 10/2011 | Tyurina | ................... G06T 5/003 |
| | | | 348/222.1 |
| 2017/0131096 A1* | 5/2017 | Karlov | ................. G01C 21/165 |
| 2019/0041217 A1 | 2/2019 | Ben-Moshe et al. | |
| 2020/0174094 A1* | 6/2020 | Tchilian | .................... G06T 7/73 |

OTHER PUBLICATIONS

International Search Report for corresponding International Application No. PCT/US2020/026954, filed Apr. 6, 2020, International Search Report dated Jul. 30, 2020 and dated Aug. 7, 2020 (4 pgs.).
Written Opinion of the International Searching Authority for corresponding International Application No. PCT/US2020/026954, filed Apr. 6, 2020, Written Opinion of the International Searching Authority dated Aug. 7, 2020 (6 pgs.).

* cited by examiner

ENHANCED STAR TRACKING

FIELD OF THE INVENTION

The disclosed invention generally relates to signal processing and electronic circuits and more particularly to enhanced star tracking.

BACKGROUND

Star tracking is used by many space platforms, such as spacecrafts, missiles, exo-atmospheric interceptors, satellites and satellite launchers, or sea platforms, such as ships, for navigation by selecting one or more star guides, when global positioning system (GPS) is not available or not sufficiently reliable. Selecting a guide star depends on the time, due to the Earth's rotation, and the location of the target/destination. Typically, several brightest stars are used for guiding.

A star tracking system includes an optical device that measures the positions of stars using photocells or a camera. Typically, the positions of many stars have been measured to a high degree of accuracy and stored in a catalog of stars, therefore, a star tracker on a space, sea or ground platform may be used to determine the orientation (attitude) of the spacecraft with respect to the stars.

The orientation, angular position, attitude, or direction of an object defines how the object is placed in the space it occupies. In order to determine the attitude of the object, the star tracker obtains an image of the stars, measures their apparent position in the reference frame of the platform, and identify the stars so their position can be compared with their known absolute position from a star catalog. A star tracker may include a processor and memory to identify stars by comparing the pattern of observed stars with the known pattern of stars in the catalog. The stars catalog may include thousands of stars with their known locations and may be stored in a memory on the platform.

Many conventional star tracking systems may become confused by sunlight reflected from the platform (e.g., spacecraft), or by exhaust gas plumes from the spacecraft thrusters. Star trackers are also susceptible to a variety of errors, for example, low and high spatial frequencies, temporal, etc., in addition to a variety of optical errors, for example, spherical aberration, chromatic aberration, etc.

SUMMARY

In some embodiments, the disclosed invention is a method for star tracking by a platform. The method includes: capturing an image of a plurality of stars; detecting visible stars from the captured image; selecting a predetermined number of brightest stars from the detected stars in the captured image; extracting features from the selected stars by forming a convex hull from the selected stars to generate a spherical polygon; computing an area of the spherical polygon; selecting a point on a sphere inside of the spherical polygon, and computing higher order moments relative to the selected point; and pattern matching the extracted feature against a database of star catalog. The pattern matching includes matching the computed area of the spherical polygon to a plurality of polygon areas stored in the database to determine matching candidates for matched stars in the database, and when a number of the matching candidates is more than one, matching a next extracted higher order moment with a respective higher order moment in the database, and repeating said matching a next extracted higher order moment until the number of the matching candidates is equal to one to select a matched single candidate from the star catalog.

In some embodiments, the disclosed invention is a system for star tracking by a platform. The system includes: a camera for capturing an image of a plurality of stars; a memory for storing a catalog of stars with known positions; and one or more processors for detecting visible stars from the captured image; selecting a predetermined number of brightest stars from the detected stars in the captured image; extracting features from the selected stars by forming a convex hull from the selected stars to generate a spherical polygon; computing an area of the spherical polygon; selecting a point on a sphere inside of the spherical polygon, and computing higher order moments relative to the selected point; and pattern matching the extracted feature against a database of star catalog. The one or more processors perform the pattern matching by matching the computed area of the spherical polygon to a plurality of polygon areas stored in the database to determined matching candidates for matched stars in the database and when a number of the matching candidates is more than one, matching a next extracted higher order moment with a respective higher order moment in the database, and repeating said matching a next extracted higher order moment until the number of the matching candidates is equal to one to select a matched single candidate from the star catalog.

In some embodiments, the disclosed invention is a non-transitory storage medium for storing a set of instructions, the set of instructions when executed by one or more processors performing a method for star tracking by a platform, the method comprising: capturing an image of a plurality of stars; detecting visible stars from the captured image; selecting a predetermined number of brightest stars from the detected stars in the captured image; extracting features from the selected stars by forming a convex hull from the selected stars to generate a spherical polygon; computing an area of the spherical polygon; selecting a point on a sphere inside of the spherical polygon, and computing higher order moments relative to the selected point; and pattern matching the extracted feature against a database of star catalog. The pattern matching includes matching the computed area of the spherical polygon to a plurality of polygon areas stored in the database to determined matching candidates for matched stars in the database and when a number of the matching candidates is more than one, matching a next extracted higher order moment with a respective higher order moment in the database, and repeating said matching a next extracted higher order moment until the number of the matching candidates is equal to one to select a matched single candidate from the star catalog.

BRIEF DESCRIPTION OF THE DRAWINGS

A more complete appreciation of the disclosed invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

In some embodiments, the disclosed invention provides multiple improvements to the existing star tracking systems. In some embodiments, the disclosed invention adds a signal-to-noise ratio (SNR) enhancing technique to improve image centroiding for better star identification, particularly dim stars. This enhances the star pattern matching process.

The present invention is applicable to space platforms, such as, spacecrafts, missiles, exo-atmospheric interceptors, satellites and satellite launchers; sea platforms, such as ships; and ground platforms, such as vehicles that have no or limited access to GPS for navigating such platforms. Accordingly, disclosed invention improves various technologies such as, space navigation, space communication, target position determination, missile technology, sea navigation, and ground navigation.

Figure 1:
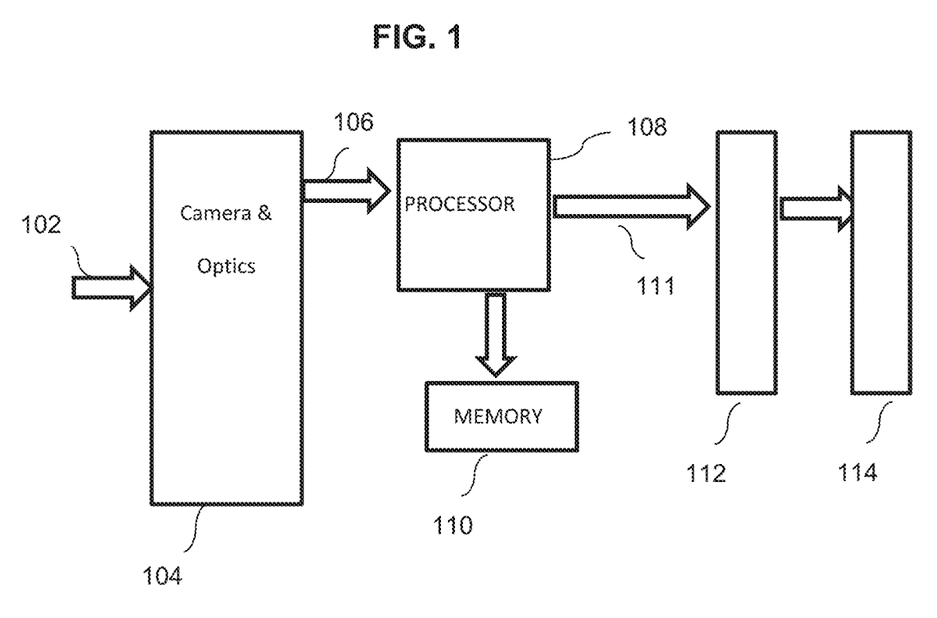
FIG. 1 shows an exemplary star tracking system, according to some embodiments of the disclosed invention.

FIG. 1 shows an exemplary star tracking system, according to some embodiments of the disclosed invention. As shown, an image of a plurality of stars 102 is captured by a camera or imager 104 that includes appropriate optics and optionally an image processor. The image of stars may include bright and dim stars and various noises due to the environment and the system. In some embodiments, the camera or imager 104 processes the captured image to filter the noises and/or amplify the signals, using conventional signal processing and image enhancement techniques. In some embodiment, all or some of the above functions may be performed by a separate processor 108. The (processed) captured image 106 is then received by the processor 108 with associated memory 110. In some embodiments, the camera and optics 104, the processor 108 and the memory 110 reside on a moving platform, such as a space, sea or ground platform.

Processor 108 selects a number of the brightest starts from the image for feature extraction and pattern matching to a star catalog that may be stored in memory 110. The number of the brightest stars selected by processor 108 may depend on the environment and required system accuracy. Depending on the onboard processor executing the process, the balance between processor throughput, timing requirements, and accuracy requirements may need to be selected as design parameters. However, at some point, there is a diminishing return on increasing the number of stars and the accuracy that is gained (as illustrated by the example data in FIG. 8). However, it would take a very long time to process all these stars. As a result, the number of selected stars is determined by the specific application.

In some embodiments, processor 108 applies an enhanced star pattern matching process using the convex hull of the visible stars and then using multiple features, such as visual magnitude, interstellar angle, area, polar moment of inertia to accurately match the observed stars against a star catalog stored in a database. Processor 108 then matches the extracted features against the stored feature of the star catalog to find a matching (guide) star group.

In some embodiments, processor 108 applies the convex hull of the visible stars (the smallest convex set that contains the stars, that is, the minimum spanning spherical polygon), extracts multiple features, such as visual magnitude, interstellar angle, area, polar moment of inertia to accurately match the observed stars against the star catalog.

An attitude determination device 112 utilizes the matching (guide) star group 111 and their known positions to determine the attitude of the platform from known absolute positions of the guide stars within the selected matching star group. In some embodiments, the attitude determination device 112 is part of the processor 108 and its functionality is implemented in software. In some embodiments, the attitude determination device 112 is a separate device, which can be onboard of the platform or offboard in a remote location wirelessly communication with the onboard processor 108.

The attitude of the platform is then used by a navigation system 114 (onboard the platform) to navigate the platform responsive to the visible stars with their known locations. After the star pattern matching process is complete and the detected stars are properly identified, the attitude determination process starts. Typical known algorithms to accomplish this include QUEST ("quaternion estimation") and SVD ("singular value decomposition") that compute the optimal rotation matrix to map the detected stars in the platform's body frame and the star catalog in the reference frame. This rotation matrix (or quaternion) is then used as a measurement or navigation aiding source by the platform's inertial navigation system (GPS is another form of navigation aiding source). Improving knowledge of navigation directly improves the platform's ability to reach the target.

Figure 2:
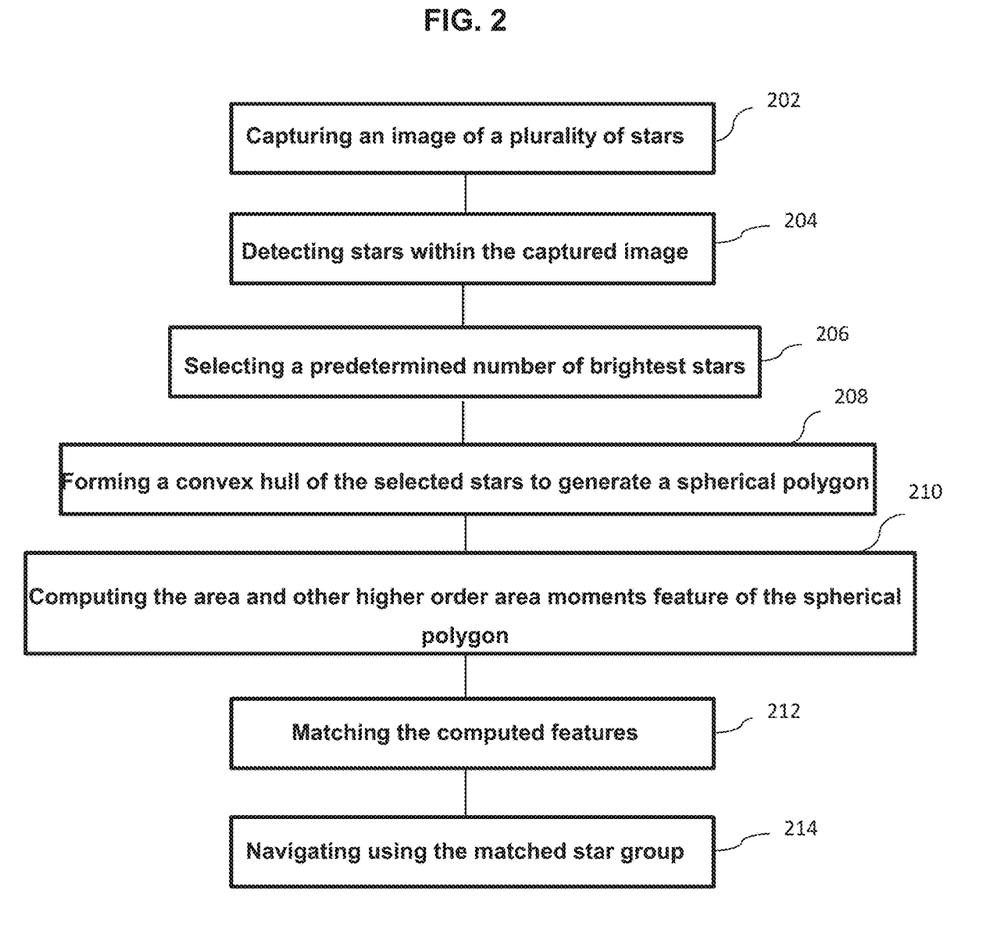
FIG. 2 illustrates an exemplary process flow for determining the attitude of a moving platform, according to some embodiments of the disclosed invention.

FIG. 2 illustrates an exemplary process flow for determining the attitude of a moving platform, according to some embodiments of the disclosed invention. The attitude of the moving platform may then be used to navigate the moving platform. In block 202, an image of a plurality of stars is captured, for example by the camera or imager 104 in FIG. 1. As described above, this image may be preprocessed for noise and amplification for better detection of the stars therein. In block 204, visible stars within the image are detected and distinguished from other potential objects and noise in the captured image, for example, by the processor 108 in FIG. 1.

In some embodiments, the processor maximizes star detection probability to improve image centroiding for better star identification (particularly dim stars) and for enhanced star pattern matching. For example, for single frame detection during Lost-in-Space (LIS) periods, a modified box filter detection technique is used. A box filter is a spatial domain linear filter (low-pass "blurring" filter), in which each pixel in the resulting image has a value equal to the average value of its neighboring pixels in the input image. Due to its property of using equal weights, a box filter can be implemented using a much simpler accumulation algorithm, which is significantly faster than using a sliding-window.

For example, assuming the pint spread function (PSF) spreads the star energy across a 3×3 pixel area, the following modified box filter algorithm is used to detect the star from the noise surrounding it (detection flag D=1):

$$D = \begin{cases} 1, & \mu_{tgt} > \mu_{box} + N \cdot \sigma_{box} \\ 0, & \text{otherwise} \end{cases} \quad (1)$$

And then, the probability of detection and false alarm performance is compared with typical methods from reference.

Figure 3A:
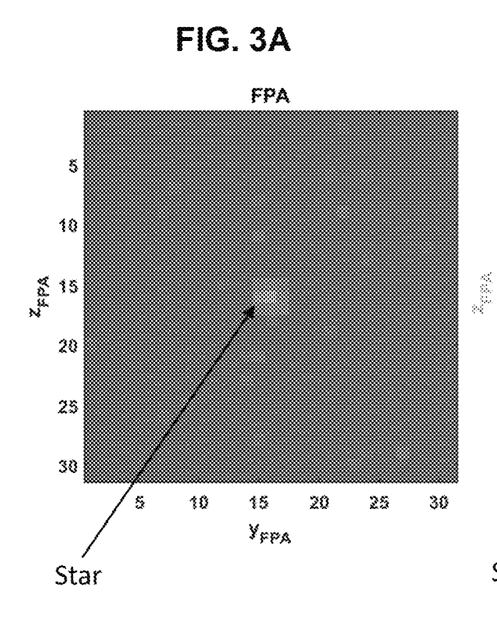
FIGS. 3A and 3B illustrate a single frame image and a 12-frame summed image, according to some embodiments of the disclosed invention.
Figure 3B:
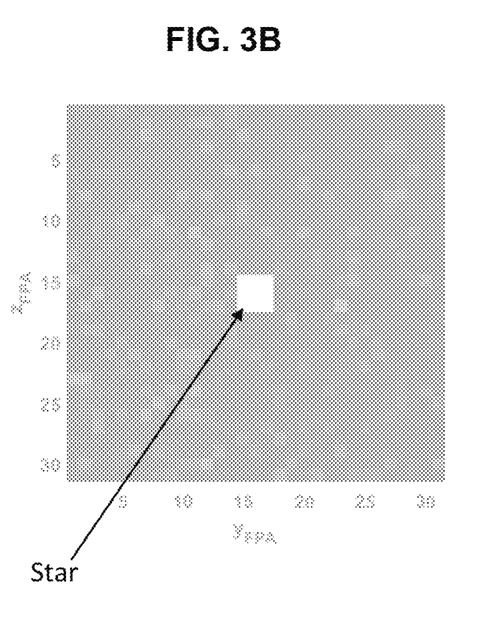

However, when attitude information is available from a navigation system, the processor uses image frame summing to enhance SNR over multiple frames. When not in LIS mode, the platform may be slewing which causes the star tracker image to be blurred. To reduce image smear, the integration time can be reduced. However, this may reduce detection capability. To balance between image smear and detection capability, frame summing is applied when not in LIS mode. Another benefit of image frame summing is increased SNR, which improves image centroiding for better star identification (particularly dim stars) and enhanced star pattern matching, as illustrated in FIGS. 3A and 3B.

Typically, there are three types of noise in the captured image: random noise, fixed pattern noise, and banding noise. Fixed pattern noise and banding noise can be corrected or reduced via lab calibration. Frame summing is well known to decrease random noise by $\sqrt{N_{frame}}$ and thus increase SNR by the same amount:

$$SNR = \frac{s}{\sigma_{RN}/\sqrt{N_{frame}}} = \frac{s\sqrt{N_{frame}}}{\sigma_{RN}} \quad (2)$$

For the frame summing (also known as frame averaging), onboard processing receives successive and multiple images (e.g., frames) and temporally "stack" the images (frames) on top of each other. It then adds the multiple images and computing the average of the summed image frames. This averaging process increases the SNR because the coherent signal is amplified whereas random and incoherent noise is averaged out. In some embodiments, the frame summing process applies the known signal averaging technique. Signal averaging is a technique applied in the time domain, to increase the SNR. By averaging a set of signal frames offset over their respective time delays, the SNR is increased.

FIGS. 3A and 3B illustrate a single frame image and a 12-frame summed image, respectively, according to some embodiments of the disclosed invention. As shown in the single frame image of FIG. 3A, the detected star image is blurred or smeared due to rotating camera or slewing of the platform. However, when several frames (12 frames in this case) are summed together, the detected star image is more focused and clearer, as depicted in FIG. 3B. In some embodiments, the number of summed image frames is a system parameter and depends on the accuracy requirement, computation time constraints, and/or the environment.

In some embodiments, the processor uses an iterative, weighted mean intensity centroiding technique for accurate, sub-pixel resolution. The centroiding technique determines the center of the distribution of each received light spot to further increase the velocity resolution to the equivalent of one pixel. The iterative, weighted mean intensity centroiding technique incorporates a weighting function to account for the point spread function of the camera optics, thereby improving centroiding accuracy. Further, the initial centroid estimate is iterated until the solution converges to a steady state value. This increases robustness to poor initial centroid estimates.

Referring back to FIG. 2, a predetermined number of brightest stars are selected from the detected stars in the captured image, in block 206. In block 208, a convex hull of the selected stars is formed to generate a spherical polygon from which, various features of the selected stars will be extracted.

Figure 4:
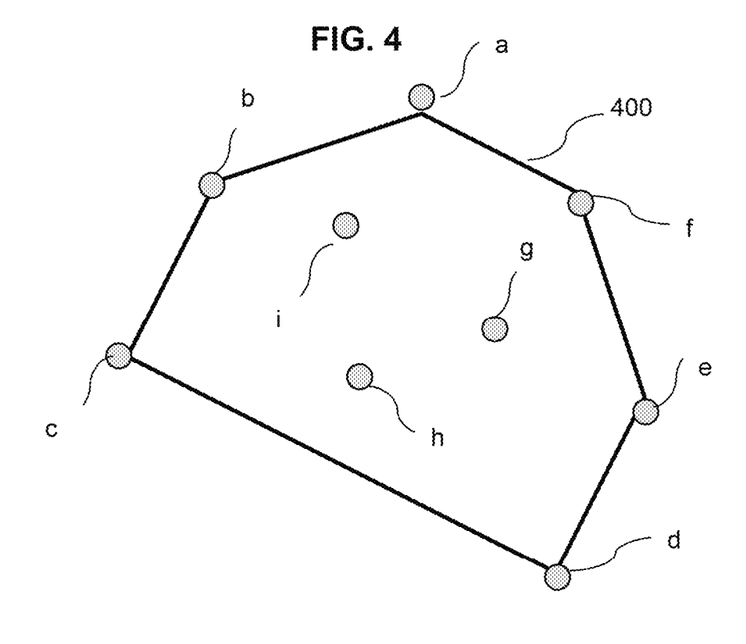
FIG. 4 depicts a convex hull of the nine stars, forming a spherical polygon for the star group, according to some embodiments of the disclosed invention.

FIG. 4 depicts a convex hull of the six stars a to f, forming a spherical polygon 400 for the notional 9-star group a-i. A number of techniques are known for computing the convex hull for a finite set of points. Typically, computing the convex hull entails constructing an unambiguous, efficient representation of the required convex shape. Output representations that have been considered for convex hull of the points (stars in this case) include a list of linear inequalities describing the facets of the hull, an undirected graph of facets and their adjacencies, or the full-face lattice of the hull. In two dimensions, it is simpler to list the points that are vertices, in their cyclic order around the hull. As depicted three stars g-i do not fall at the corners of the spherical polygon 400 and therefore are being ignored. By the definition of a convex hull, the three stars denoted by g-i are not on the convex hull and therefore are excluded from further consideration in the subsequent steps of the star pattern matching process.

Referring back to FIG. 2, in block 210, the area and other higher order moments of the spherical polygon are then computed. In some embodiments, a point, for example, a centroid, on a sphere inside of the spherical polygon is selected, and higher order moments (in addition to the calculated areas) relative to the selected point of the spherical polygon are computed to generate the extracted features of the polygon.

Figure 5:
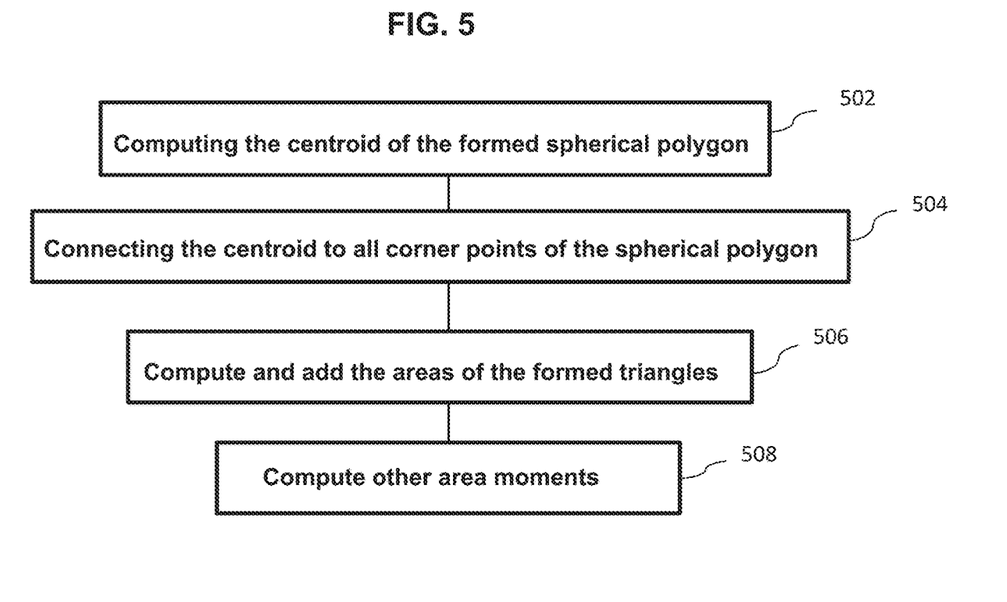
FIG. 5 illustrates an exemplary process flow for calculating the area and higher order moments from a spherical polygon, according to some embodiments of the disclosed invention.

FIG. 5 illustrates an exemplary process flow for calculating the area and higher order moments from a spherical polygon, according to some embodiments of the disclosed invention. In block 502, a point, for example, the centroid of the formed spherical polygon is computed. In block 504, the centroid is connected to all corner points of the spherical polygon to create multiple spherical triangles. In block 506, the areas of the formed triangles are computed and summed up to obtain the area of the spherical polygon, instead of much more computationally complex direct calculation of the polygon area. In block 508, other moments features, such as polar moment of inertia of the polygon may be computed, for example, from Equation 9, 10 and 11 below. For example, the polar moment for each spherical triangle is computed and the polar moment for the spherical polygon is computed responsive to the polar moments of the spherical triangles, for example, by adding the polar moments of the spherical triangles together.

In some embodiments, visual magnitude and interstellar angle features are outside of the moment calculation. In these embodiments, the above two features are the first two features used to check for uniqueness in the star pattern matching process. If these two features are insufficient, then other features (moments) such as spherical polygon area and polar moment of inertia are then matched against the star catalog.

In summary, for quantity X, where X=area or higher order moment, the area or higher order moment is computed by breaking the spherical polygons into smaller components of spherical triangles. Then, the property for X (such as area or higher order moment) of each spherical triangle is computed. Subsequently, the spherical triangles are added to obtain the total area for the spherical polygon and compute other higher order moments, as described below.

Referring back to FIG. 2, in block 212, the extracted features are matched against a database of star catalog. In some embodiments, the matching comprises matching the computed area of the spherical polygon to a plurality of polygon areas stored in the database to determined candidates for matched stars in the database. When a number of the candidates is more than one, a next extracted higher order moment is matched with respective higher order moments of the stars in the database, and matching a next extracted higher order moment is repeated until the number of the matched candidates is equal to one and thus there is no ambiguity of the (single) matched candidate. This way, to have an effective matched candidate, a single candidate match is selected since if there's more than one match, the guide star group becomes ambiguous and as a result, more extracted features are selected for match to get a unique match with the star catalog. The single matched (guide) star group is then used by a navigation system to navigate the platform responsive to the (matched) visible stars with their known locations, in block 214.

Figure 6:
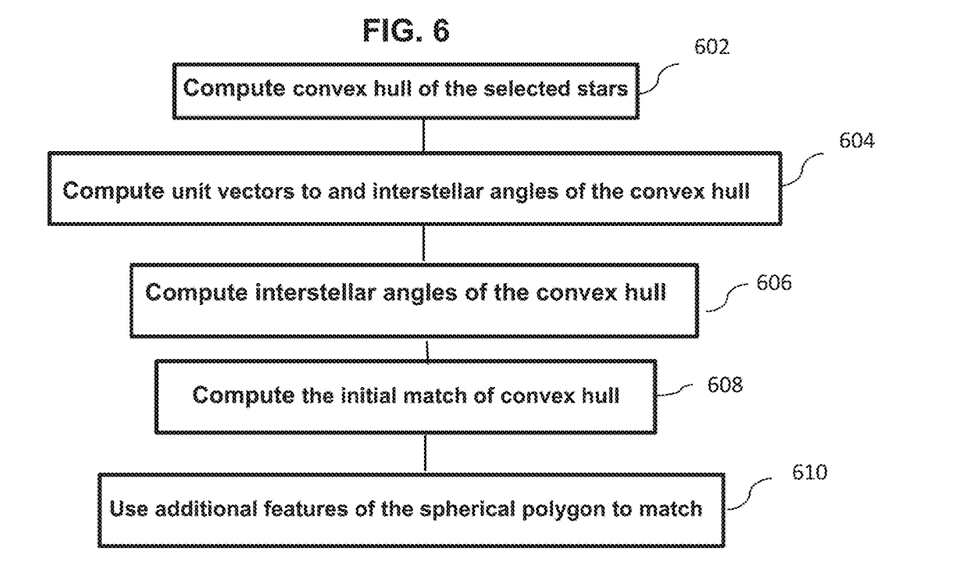
FIG. 6 shows an exemplary process flow for matching features of a selected star group with stored feature in a database, according to some embodiments of the disclosed invention.

FIG. 6 shows an exemplary process flow for matching features of a selected star group with stored feature in a database, according to some embodiments of the disclosed invention. As shown in block 602, convex hull of the selected stars is computed. In block 604, unit vectors to the convex hull are computed and interstellar angles of the convex hull are computed, in block 606. In block, 608, the initial match of observed convex hull (which defines the spherical polygon) of the stars is computed against the star catalog, using known methods for example, using the known N-vertex matching algorithm. In some embodiments, the features used for this initial match are the interstellar angle and the visual magnitude. To further increase robustness and accuracy of the matching process (e.g., to resolve potential ambiguity in the pattern matching process), in block 610, additional (higher order) features of the spherical polygon created by the convex hull are employed, such as one or more of polar moment of inertia and area of the spherical polygon.

Assuming the points that make up the spherical polygon all lie in a hemisphere and the polygon is convex, there exists a point inside the polygon that can be connected to any other point inside and on the boundary by a great circle lying completely inside the polygon (not on the edges). The polygon has N corner points which are connected by great circles $\overline{P_1P_2}$, $\overline{P_2P_3}$, etc. The points $P_i$, I=1, 2, . . . , N are thus all unit vectors in a hemisphere. The distance $d(P_1, P_2)$ between two points on the sphere is given by the central angle $\alpha = \cos^{-1}(\vec{u}_1^T \vec{u}_2)$, where $\vec{u}_1$ and $\vec{u}_2$ are the unit vectors defining the points $P_1$ and $P_2$ respectively and the arc length of the great circle connecting the two points. The centroid C (a unit vector) of the polygon $(P_1, \ldots, P_N)$ is a point inside the polygon such that:

$$\frac{1}{N}\sum_{i=1}^{N} d(C, \vec{u}_i) = \min_{x \in Polygon} \frac{1}{N}\sum_{i=1}^{N} d(x, \vec{u}_i) \quad (3)$$

Figures 7A, 7B:
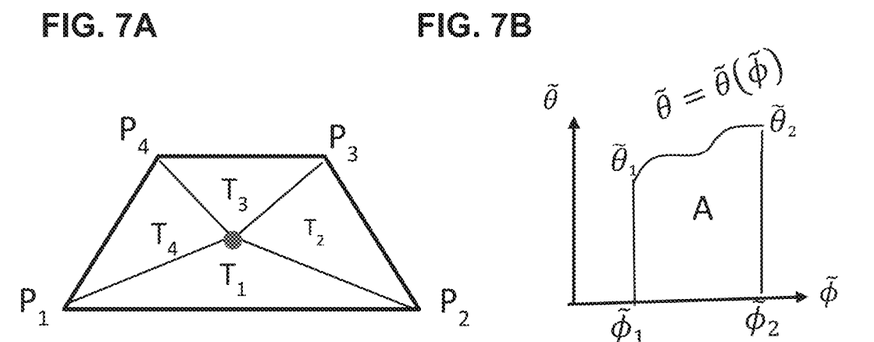
FIGS. 7A, 7B and 7C illustrate various geometries of a spherical polygon for area computation, according to some embodiments of the disclosed invention.

Subsequently, a new spherical coordinate frame is introduced such that the new polar axis goes through the centroid C. All corner points of the polygon can now be expressed in this new set of spherical coordinates $(\phi, \theta)$ in terms of the original spherical coordinates $(\tilde{\phi}, \tilde{\theta})$. The distance between C and any other point P in the polygon is the latitude $\vec{\theta}$ measured from C south to the point P, as shown in FIG. 7A. Due to the convexity assumption, the polygon can easily be triangulated, as shown below. This leads to the corresponding triangles, $T_i = (P_i, P_{i+1}, C)$, as shown in FIG. 6A. Note that $P_{N+1} = P_1$.

In the parameter plane $(\tilde{\phi}, \tilde{\theta})$, the triangles are areas as shown in FIG. 7B. In geodesic polar coordinates:

$$\xi = \tilde{\theta} \cos \tilde{\phi}, \tilde{\eta} = \tilde{\theta} \sin \tilde{\phi} \quad (4)$$

Figure 7C:
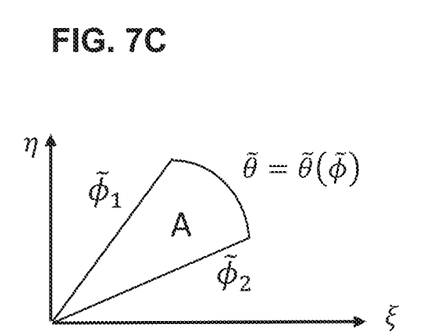

The area A then becomes a wedge in the tangent plane $(\xi, \eta)$ at the new pole, as depicted in FIG. 7C. The central area moments of the polygon are then defined as:

$$A_\xi = \sum_{i=1}^{N} \int_{T_i} \xi \, ds \quad (5)$$

$$A_\eta = \sum_{i=1}^{N} \int_{T_i} \eta \, ds \quad (6)$$

$$ds = \sin \tilde{\theta} d\tilde{\theta} d\tilde{\phi} \quad (7)$$

where ds is an area element of the sphere.

The polar centroid moment is given by:

$$A_{\tilde{\theta}} = \sum_{i=1}^{N} \int_{T_i} \tilde{\theta} \, ds \quad (8)$$

The higher moments are given by n=2, . . . , in Equation (11):

$$A_\xi^n = \sum_{i=1}^{N} \int_{T_i} \xi^n ds \quad (9)$$

$$A_\eta^n = \sum_{i=1}^{N} \int_{T_i} \eta^n ds \quad (10)$$

$$A_{\tilde{\theta}}^n = \sum_{i=1}^{N} \int_{T_i} \tilde{\theta}^n ds \quad (11)$$

The central zero order moment (area of the polygon) is given by setting n=0 in Equation (11):

$$A = \sum_{i=1}^{N} \int_{T_i} ds = \text{area of polygon} \quad (12)$$

To calculate the altitude and latitude of the spherical triangle (see, for example, FIGS. 7B and 7C), one needs $\tilde{\theta} = \tilde{\theta}(\tilde{\phi})$ along a great circle connecting $P_i$ and $P_{i+1}$. The solution is:

$$\cot \tilde{\theta} = a \cdot \cos(\tilde{\phi} - \phi_o), 0 \leq \tilde{\theta} < \frac{\pi}{2} \quad (13)$$

The constants a and $\phi_o$ are determined from:

$$\cot \tilde{\theta}_i = a \cdot \cos(\tilde{\phi}_i - \phi_o), \cot \tilde{\theta}_{in} = a \cdot \cos(\tilde{\phi}_{in} - \phi_o) \quad (14)$$

There are infinitely many solutions $(a, \phi_o)$ but they all characterize the same great circle connecting $P_i$ and $P_{i+1}$. The parameter a can be eliminated, which leads to:

$$\frac{\cot \tilde{\theta}_i}{\cot \tilde{\theta}_{in}} = \frac{\cos(\tilde{\phi}_i - \phi_0)}{\cos(\tilde{\phi}_{in} - \phi_0)} \quad (15)$$

This is a nonlinear equation for $\phi_0$, and $\phi_o$ is only determined within an integer multiple of p. Then a is determined up to sign. This does not change $\tilde{\theta}(\tilde{\phi})$. In the equation over a triangle $T_i$ is now a double integral over the wedge $\tilde{T}_i$ in the tangent plane of C.

In some embodiments, the processes illustrated in FIGS. 2, 5 and 6, may be executed by one or more processors by storing a set of instructions that when executed by the one or more processors perform the processes for star tracking.

Figure 8:
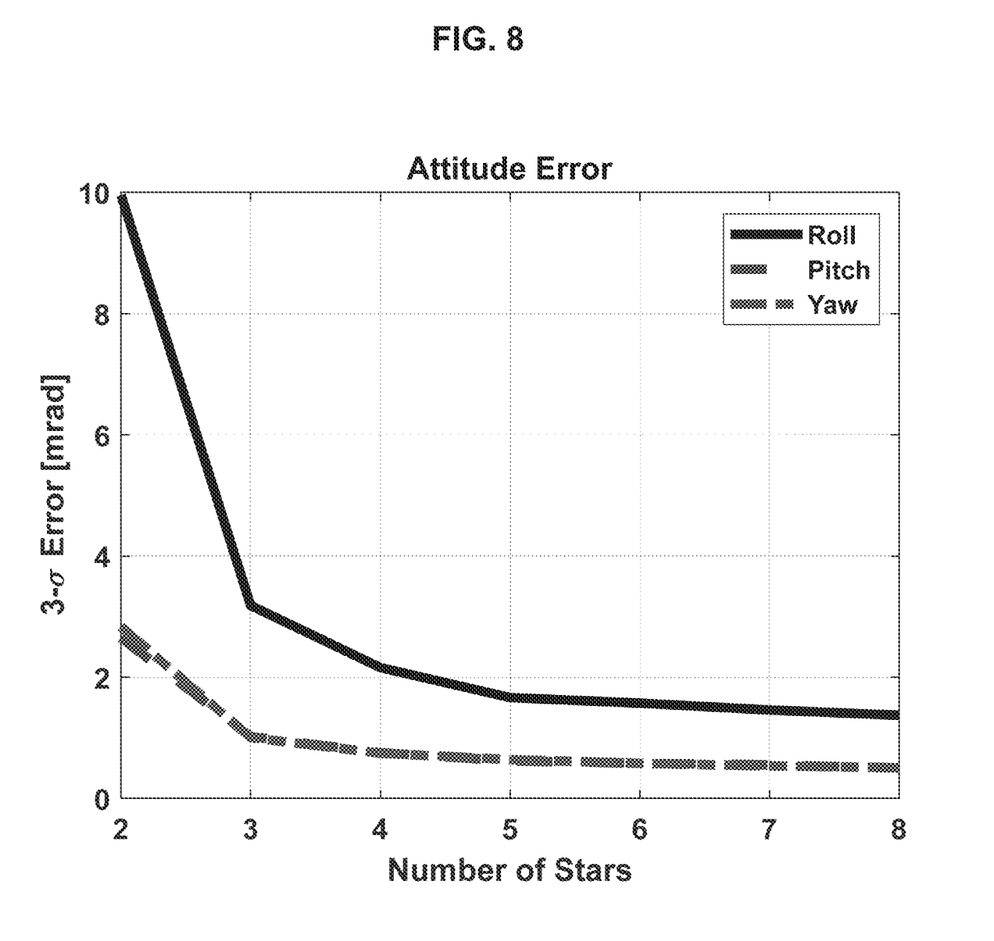
FIG. 8 is a graph illustrating the error in the computed attitude, according to some embodiments of the disclosed invention.

FIG. 8 is a graph illustrating the error in the computed attitude, according to some embodiments of the disclosed invention. In this example, it is assumed that the instantaneous field of view (IFOV)=500 mrad/pix, 1024×1024 pix FPA, measurement, 1-$\sigma$ error=⅕ pix, and no star pattern matching errors. As shown, as the number of stars selected increases, the (3-$\sigma$) error substantially decreases. Also, attitude accuracy improves with increase FOV size and better measurement accuracy.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims and drawings.

What is claimed is:

1. A method for star tracking by a platform, the method comprising:
   capturing an image of a plurality of stars;
   performing filtering to detect visible stars from the captured image;
   selecting a predetermined number of brightest stars from the detected visible stars in the captured image;
   forming a convex hull from the selected brightest stars to generate a spherical polygon, wherein the spherical polygon includes four or more sides;
   excluding from consideration a number of brightest stars that do not fall at corners of the spherical polygon;
   computing an area of the spherical polygon;
   selecting a point on a sphere inside of the spherical polygon, and computing higher order moments relative to the selected point; and
   pattern matching the computed area of the spherical polygon to a plurality of polygon areas stored in a database to determine matching candidates for matched stars in the database, and when a number of the matching candidates is more than one, matching a next extracted higher order moment with a respective higher order moment in the database, and repeating said matching a next extracted higher order moment until the number of the matching candidates is equal to one to select a matched single candidate from the star catalog.

2. The method of claim 1, wherein generating the spherical polygon further comprises:
   connecting the selected point to each corner of the spherical polygon to divide the spherical polygon to a plurality of spherical triangles,
   computing an area of each spherical triangle;
   computing a polar moment for each spherical triangle;
   adding the calculated areas together to obtain a total area of the spherical polygon; and
   computing a polar moment for the spherical polygon responsive to the polar moments of the spherical triangles.

3. The method of claim 1, further comprising determining an attitude of the platform responsive to the matched single candidate.

4. The method of claim 3, wherein determining an attitude of the platform comprises utilizing the matched single candidate and known positions of the detected stars within the matched single candidate to determine the attitude of the platform.

5. The method of claim 3, further comprising utilizing the attitude of the platform to navigate the platform responsive to the visible stars with their known locations.

6. The method of claim 1, further comprising maximizing probability of star detection in the captured image to improve image centroiding for star identification and for enhanced star pattern matching.

7. The method of claim 1, further comprising: for single frame detection during Lost-in-Space (LIS) periods, utilizing a modified box filter detection technique.

8. The method of claim 1, further comprising: when attitude information of the platform is available, utilizing image frame summing to enhance signal-to-noise ratio (SNR) over multiple image frames.

9. The method of claim 8, wherein the image frame summing comprises receiving successive and multiple image frames; temporally stacking the image frames on top of each other; summing the stacked multiple image frames; and computing the average of the summed image frames.

10. The method of claim 1, further comprising utilizing an iterative, weighted mean intensity centroiding process to determine a center of the distribution of each received light spot in the captured image to increase a velocity resolution to an equivalent of one pixel in the captured image, by incorporating a weighting function to account for a point spread function of camera optics capturing the image.

11. The method of claim 1, wherein the pattern matching comprises: computing a convex hull of the selected stars; computing unit vectors to and interstellar angles of the convex hull, computing the area of the spherical polygon as an initial match of the convex hull; and computing a polar moment for the spherical polygon as the next extracted higher order moment for matching.

12. A system for star tracking by a platform comprising:
   camera for capturing an image of a plurality of stars;
   a memory for storing a catalog of stars with known positions; and
   one or more processors for detecting visible stars from the captured image; selecting a predetermined number of brightest stars from the detected visible stars in the captured image; forming a convex hull from the selected brightest stars to generate a spherical polygon, wherein the spherical polygon includes four or more sides; excluding from consideration a number of brightest stars that do not fall at corners of the spherical polygon; computing an area of the spherical polygon; selecting a point on a sphere inside of the spherical polygon, and computing higher order moments relative to the selected point; and pattern matching the computed area of the spherical polygon to a plurality of polygon areas stored in a database to determined matching candidates for matched stars in the database, and when a number of the matching candidates is more than one, matching a next extracted higher order moment with a respective higher order moment in the database, and repeating said matching a next extracted higher order moment until the number of the matching candidates is equal to one to select a matched single candidate from the star catalog.

13. The system of claim 12, wherein the one or more processors determine an attitude of the platform responsive to the matched single candidate.

14. The system of claim 13, wherein the one or more processors determine the attitude of the platform by utilizing the matched single candidate and known positions of the detected stars within the matched single candidate to determine the attitude of the platform.

15. The system of claim 13, further comprising a navigation system for utilizing the attitude of the platform to navigate the platform responsive to the visible stars with their known locations.

16. The system of claim 12, wherein the platform is one or more of a moving space platform, a moving sea platform and a moving ground platform.

17. The system of claim 12, wherein the one or more processors perform the pattern matching by computing a convex hull of the selected stars; computing unit vectors to and interstellar angles of the convex hull, computing the area of the spherical polygon as an initial match of the convex hull; and computing a polar moment for the spherical polygon as the next extracted higher order moment for matching.

18. A non-transitory storage medium for storing a set of instructions, the set of instructions when executed by one or more processors performing a method for star tracking by a platform, the method comprising:

capturing an image of a plurality of stars;

performing filtering to detect visible stars from the captured image;

selecting a predetermined number of brightest stars from the detected visible stars in the captured image;

forming a convex hull from the selected brightest stars to generate a spherical polygon, wherein the spherical polygon includes four or more sides;

excluding from consideration a number of brightest stars that do not fall at corners of the spherical polygon;

computing an area of the spherical polygon;

selecting a point on a sphere inside of the spherical polygon, and computing higher order moments relative to the selected point; and pattern matching the computed area of the spherical polygon to a plurality of polygon areas stored in a database to determine matching candidates for matched stars in the database, and when a number of the matching candidates is more than one, matching a next extracted higher order moment with a respective higher order moment in the database, and repeating said matching a next extracted higher order moment until the number of the matching candidates is equal to one to select a matched single candidate from the star catalog.

19. The non-transitory storage medium of claim 18, wherein the method further comprises determining an attitude of the platform responsive to the matched single candidate, and utilizing the attitude to navigate the platform responsive to the visible stars with their known locations.

20. The non-transitory storage medium of claim 18, wherein the pattern matching comprises: computing a convex hull of the selected stars; computing unit vectors to and interstellar angles of the convex hull, computing the area of the spherical polygon as an initial match of the convex hull; and computing a polar moment for the spherical polygon as the next extracted higher order moment for matching.

* * * * *